(12) United States Patent
Benarous et al.

(10) Patent No.: US 10,404,121 B2
(45) Date of Patent: Sep. 3, 2019

(54) ELECTROMECHANICAL ACTUATOR DAMPING

(71) Applicant: Goodrich Actuation Systems Limited, Solihull, West Midlands (GB)

(72) Inventors: Maamar Benarous, West Midlands (GB); Jerôme A. Socheleau, Vernouillet (FR)

(73) Assignee: GOODRICH ACTUATION SYSTEMS LIMITED, Solihull, West Midlands (GB)

( * ) Notice: Subject to any disclaimer, the term of this patent is extended or adjusted under 35 U.S.C. 154(b) by 506 days.

(21) Appl. No.: 15/135,842

(22) Filed: Apr. 22, 2016

(65) Prior Publication Data

US 2016/0315515 A1    Oct. 27, 2016

(30) Foreign Application Priority Data

Apr. 22, 2015 (EP) .................. 15164691

(51) Int. Cl.
| | |
|---|---|
| H02K 5/24 | (2006.01) |
| H02K 3/16 | (2006.01) |
| H02K 3/20 | (2006.01) |
| H02K 1/02 | (2006.01) |
| H02K 1/16 | (2006.01) |
| H02K 1/27 | (2006.01) |
| H02K 3/48 | (2006.01) |

(52) U.S. Cl.
CPC ............... *H02K 3/16* (2013.01); *H02K 1/02* (2013.01); *H02K 1/165* (2013.01); *H02K 1/2706* (2013.01); *H02K 3/20* (2013.01); *H02K 3/48* (2013.01)

(58) Field of Classification Search
CPC .......... H02K 1/165; H02K 1/265; H02K 3/12; H02K 3/16; H02K 1/04; H02K 3/48
USPC ................... 310/51, 124–125, 151, 210–212
See application file for complete search history.

(56) References Cited

U.S. PATENT DOCUMENTS

| | | | |
|---|---|---|---|
| 2,300,520 | A | 11/1942 | Pollard |
| 3,246,188 | A | 4/1966 | McGarvey et al. |
| 2,831,133 | A | 4/1998 | Hansen et al. |
| 2005/0046304 | A1* | 3/2005 | Tamaki ............... H02K 21/046 310/254.1 |
| 2013/0270934 | A1* | 10/2013 | Smith .................... H02K 3/521 310/50 |
| 2014/0292134 | A1 | 10/2014 | Tsuda et al. |

FOREIGN PATENT DOCUMENTS

JP         S612752 U         1/1986

OTHER PUBLICATIONS

Extended European Search Report of the European Patent Office for International Application No. EP15164691, dated Dec. 21, 2015, 9 pages.

* cited by examiner

*Primary Examiner* — Thanh Lam
(74) *Attorney, Agent, or Firm* — Cantor Colburn LLP

(57) ABSTRACT

The invention provides a stator for an electric motor comprising a plurality of radially inwardly extending teeth and comprising conductive material incorporated in one or more of the teeth.

2 Claims, 6 Drawing Sheets

ELECTROMECHANICAL ACTUATOR DAMPING

FOREIGN PRIORITY

This application claims priority to European Patent Application No. 15164691.6 filed Apr. 22, 2015, the entire content of which is incorporated herein by reference.

TECHNICAL FIELD

The present invention is concerned with a damping arrangement for an electromechanical actuator (EMA).

BACKGROUND OF THE INVENTION

Electromechanical actuators are used in a wide range of technology for actuating system parts, for example in engine, machine, vehicle or aviation technology.

An EMA motor comprises a stator assembly and a rotor. Power is supplied to the stator which results in generation of forces causing the rotor to rotate relative to the stator.

A stator assembly generally comprises a cylindrical back plate and a plurality of teeth extending radially inwards from the inner surface of the back plate. The teeth are separated by slots and electromagnetic coils are wound between the slots. The teeth surround a rotating central rotor having corresponding teeth. The resulting stator electromagnets are successfully energised by an external control circuit. As each electromagnet is powered, this creates an attractive force between the stator teeth and the rotor teeth to cause rotation of the rotor relative to the stator.

A stator assembly generally consists of a set of magnetic steel laminations insulated from each other and glued, pressed or welded to form the stator core pack.

Laminations are slotted, defining the teeth, and wound with typically copper wire to form one or more pairs of magnetic poles when energised by an external supply.

As the stator coils are energised they generate a magnetic field which will interact with the field produced by a set of magnets (in this case permanent magnets) placed on the motor rotor. The interaction between the two fields enables the motor to rotate.

Electromechanical actuators are finding increased use in applications where previously hydraulic actuators have been used, e.g. in aircraft, such as in the primary and secondary flight control actuators and nose wheel steering systems, and also in many other fields.

Damping is often required in actuation systems or motor driven systems. For certain applications such as aileron, elevator or rudder for primary flight control or nose wheel steering, damping function is required. This function is necessary to prevent flutter of aerodynamic surface for an aileron, elevator and rudder in case of a power loss scenario. It also prevents hitting roughly the mechanical stops in the situation of wind gust. For a nose wheel steering application damping will minimise nose wheel shimmy which is undesirable, and destructive.

Where hydraulic systems are used, the damping function is provided by a bypass restrictor. Where an EMA is used, however, there is no hydraulic fluid and so an alternative damping mechanism is required. Existing EMA systems have used a damper unit or component bolted on to the electric motor, e.g. to the motor shaft. This, whilst effective, increases the overall weight and size of the motor and involves increased manufacture time and costs.

The present invention aims to provide an improved electromechanical actuator motor damping arrangement.

SUMMARY

The invention provides a stator for an electric motor comprising a plurality of radially inwardly extending teeth and comprising conductive material incorporated in one or more of the teeth.

The conductive material is preferably nonmagnetic with a given resistivity such as copper, aluminium, bronze, etc. The material choice depends on the desired performance required from the damper.

In preferred embodiments, conductive material is incorporated into the stator teeth by being embedded into the teeth.

The conductive material may be in the form of rods or bars embedded into the teeth, although other forms are conceivable.

In order to obtain damping torque, the conductive material needs to be shorted.

Where the conductive material is provided at or extends to the ends of the stator, the shorting can be done by, for example, providing a ring around the teeth in contact with the conductive material. The ring can be shaped to have a corresponding teeth and slot structure to avoid interfering with the stator windings.

Such shorting is, in preferred embodiments, provided at each axial end of the rotor.

In operation of the motor, as the rotor magnets rotate, the magnetic flux will induce voltage into the conductive material. The relative motion between the stator and the rotor will generate a torque which will oppose the useful torque produced by the motor. Eddy-currents are created by the relative motion between the rotating permanent magnets on the rotor, and the stationary conductive bars integrated into the motor stator. The generated currents induce a drag torque, hence a deceleration of motion.

The negative torque produced by the interaction of magnets and the cage on the stator needs to be overcome by the motor in case of positive torque demand.

The characteristic of the drag torque is function of the rotor speed, the area of the conductive bars and the resistivity of the bars for a given magnetic field.

BRIEF DESCRIPTION OF DRAWINGS

Preferred embodiments of the invention will now be described, by way of example only, with reference to the drawings.

DETAILED DESCRIPTION OF THE INVENTION

Figure 1A:
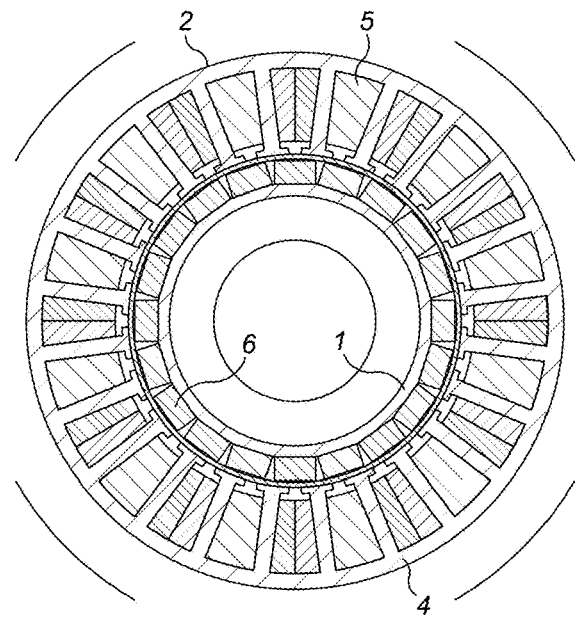
FIG. 1A is an end section view of the rotor and stator assembly of a conventional EMA motor.
Figure 1B:
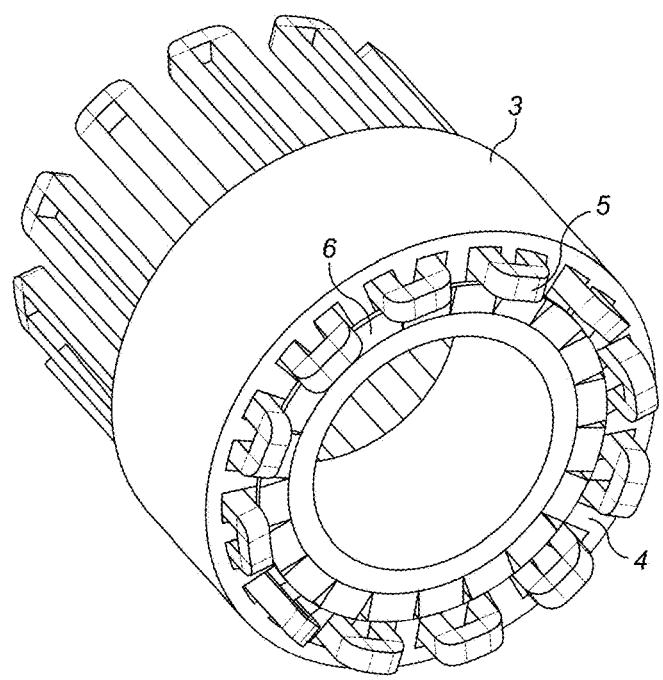
FIG. 1B is a perspective partially cut-away view of a conventional rotor and stator assembly.

Referring first to FIGS. 1A and 1B, an EMA generally comprises a motor having a rotor 1 and a stator 2 assembly.

A stator assembly usually consists of a stator core pack or back plate 3 which is usually formed of a set of magnetic steel laminations insulated from each other and glued, pressed or welded together to form the stator pack. Laminations are slotted, to define a series of inwardly extending teeth 4, and are wound with, typically, copper wire to form one or more pairs of magnetic poles 5 when energised by an external power supply.

As the stator coils 5 are energised, they generate a magnetic field which will interact with the field produced by a set of magnets 6, e.g. permanent magnets, placed on the motor rotor. The interaction between the two fields causes relative movement of the rotor to the stator enabling the motor to rotate.

Other forms of motor are also known, for example where the stator pack is formed from compressed iron powder or the like.

As can be seen, the form of the stator comprises teeth 4 extending radially inwards from the stator back plate 3.

Figure 2:
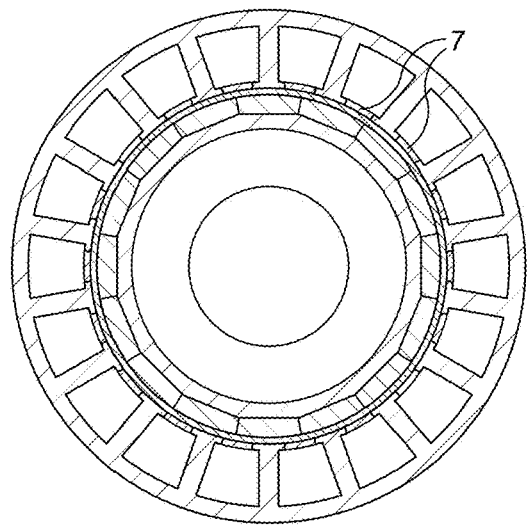
FIG. 2 is a sectional view through the stator according to an embodiment of the invention.

As seen in FIG. 2, in the present invention, damper bars or rods 7 are embedded in the teeth and preferably extend axially along the teeth from one end of the stator pack to the other.

To provide the damping effect, the damper bars are shorted.

In one example, a ring 8 is provided at each end of the stator pack, making contact with the respective ends of the damper bars to provide shorting.

Various forms of such a shorting ring or construction are possible. In some embodiments, all of the damper bars are shorted, but in other embodiments, only some bars need to be shorted.

Figure 3:
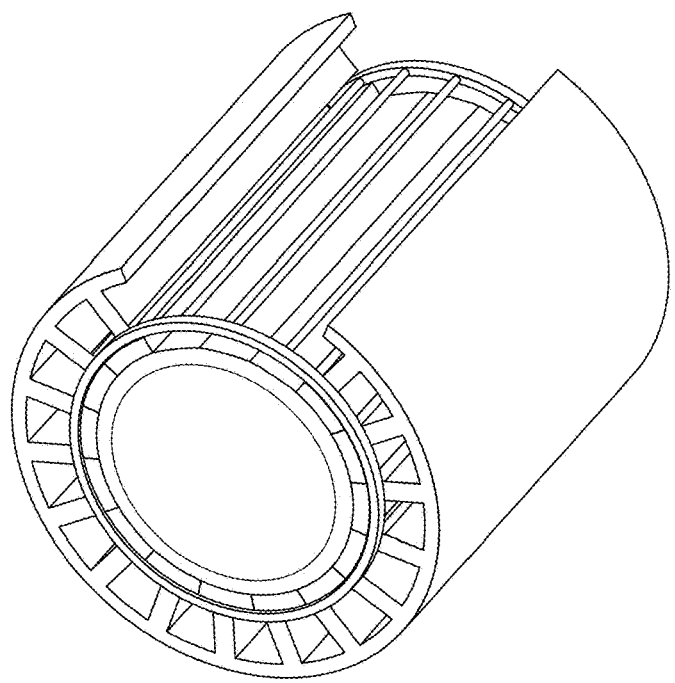
FIG. 3 is a perspective, cut-away, view of a stator according to one embodiment of the invention.
Figure 4:
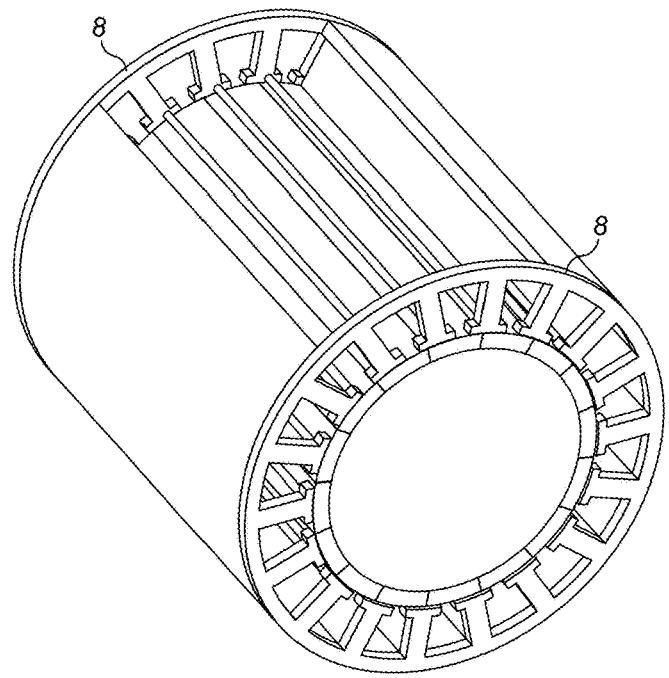
FIG. 4 is a perspective, cut-away view of the stator according to another embodiment of the invention.

The ring can be a continuous simple ring (FIG. 3) at the ends of the stator pack, making contact with all of the damper bars. Alternatively, the ring (FIG. 4) could have a construction corresponding to the sectional shape of the teeth of the rotor.

FIGS. 5A to 5G show a number of possible variations for shorting the damper bars. Other variations are also conceivable.

Figure 5A:
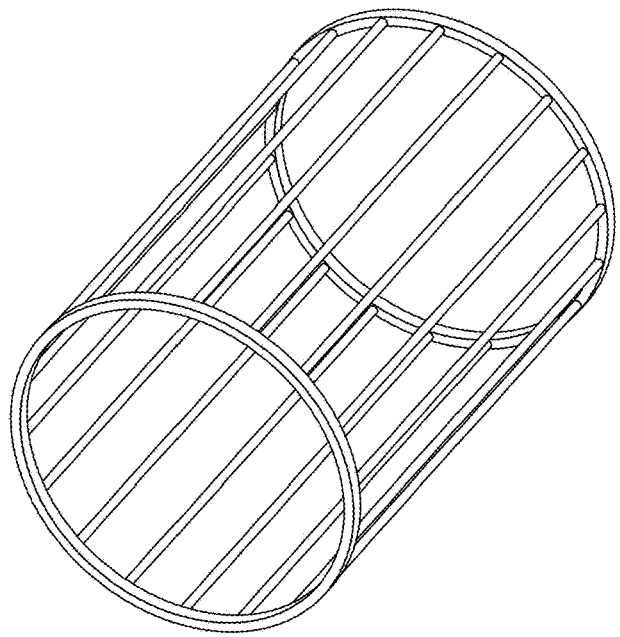
FIGS. 5A to 5G show some possible bar configurations.

FIG. 5A shows an embodiment in which all of the bars are shorted by providing continuous rings at two ends of the stator pack.

Figure 5B:
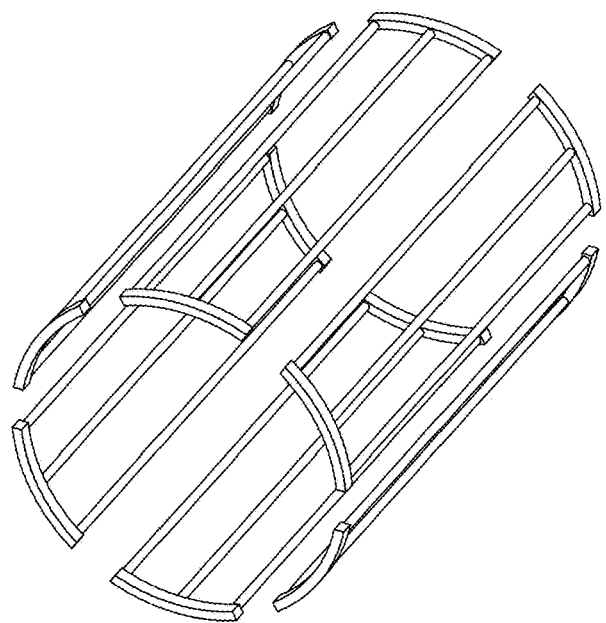
Figure 5C:
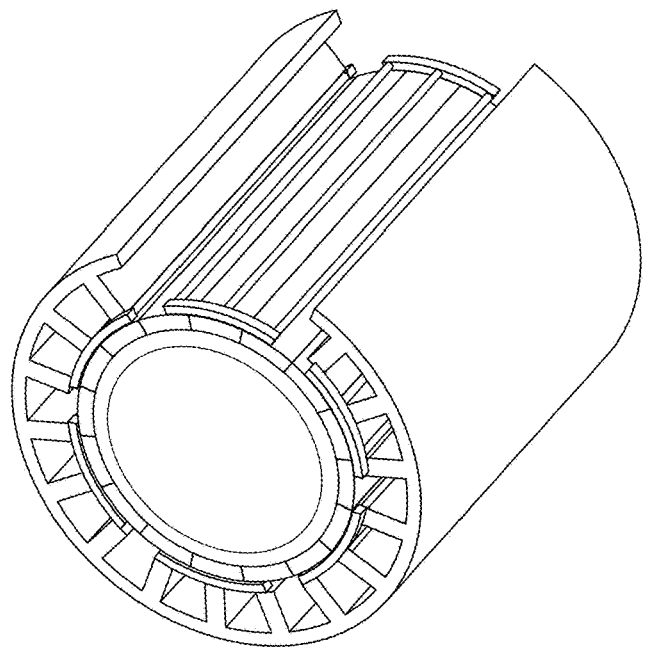

In the embodiment of FIG. 5B, bars are shorted in groups of three. FIG. 5C shows how an embodiment such as shown in FIG. 5B is fitted into the stator pack.

Figure 5D:
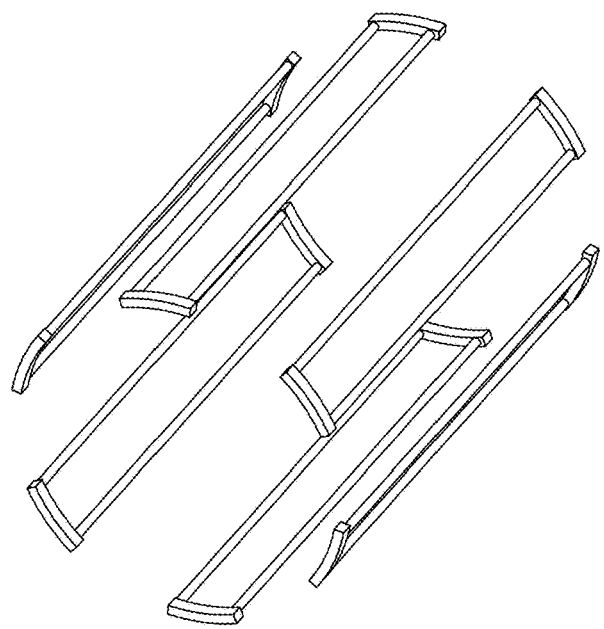
Figure 5E:
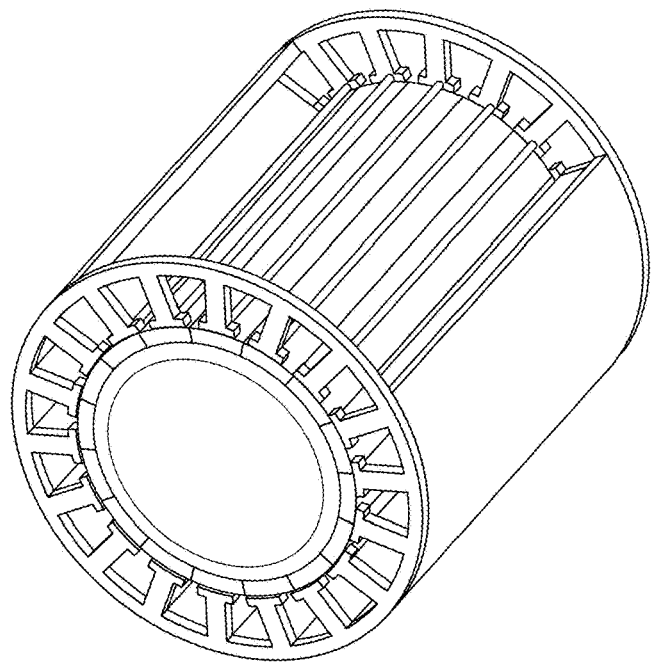
Figure 5F:
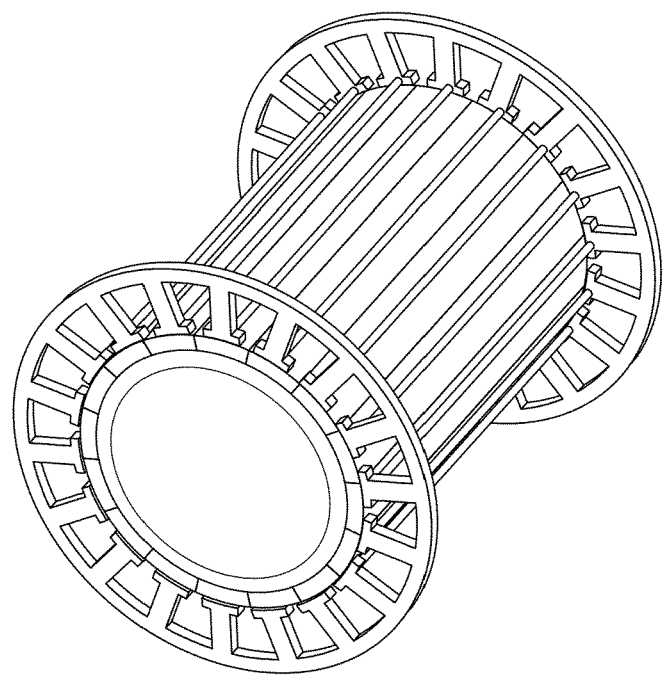
Figure 5G:
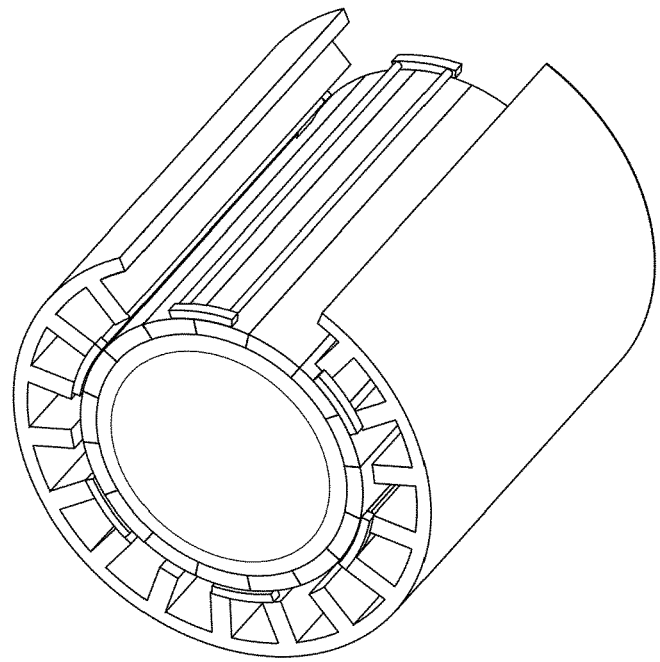

Another embodiment is shown in FIG. 5D, in which bars are shorted in pairs and FIG. 5G shows how such an embodiment is built into the stator pack.

In the embodiment of FIG. 5F, all of the bars are shorted by use of rings having a profile similar to the profile of the stator lamination and FIG. 5E shows how this is constructed into the stator pack.

The magnitude of damping can be controlled by selecting an appropriate shorting configuration, for example by shorting a given number of bars. Alternatively, or in addition, the damping characteristic can be changed by changing the damper bar material.

The present invention thus provides a passive damper arrangement integrated into an existing EMA electric motor, which has a robust and reliable construction.

The present invention allows the damping function to be integrated into the motor components, as a single unit. Integration of the damper into the electric motor reduces both the volume and weight of the actuator and also enables the use of a single set of magnets for both motoring and damping. This will have a direct impact on the cost of the actuator. Furthermore, the reduction of component parts will increase its reliability.

The invention claimed is:

1. An actuator comprising:
   an electric motor, the electric motor comprising:
   a rotor and a stator, the stator comprising a plurality of radially inwardly extending teeth;
   damping means to provide a damping function to actuator, the damping means comprising rods or bars of electrically conductive material incorporated into one or more of the stator teeth, wherein the bars extend along the stator teeth from one axial end of the stator to another axial end of the stator; and
   means for shorting the conductive material, the means for shorting including a shorting ring in contact with the damping means.

2. The actuator of claim 1, wherein the means for shorting comprises a shorting ring at each axial end of the stator.

* * * * *